(12) United States Patent
Russell et al.

(10) Patent No.: US 8,144,870 B2
(45) Date of Patent: Mar. 27, 2012

(54) ENCODING AND DETECTING APPARATUS

(75) Inventors: Mark Julian Russell, Berkshire (GB); Clive Henry Gillard, Hampshire (GB); Daniel Luke Hooper, Surrey (GB); Ian McLean, Surrey (GB); Daniel Warren Tapson, London (GB); Stephen Mark Keating, Berkshire (GB)

(73) Assignee: Sony United Kingdom Limited, Weybridge (GB)

( * ) Notice: Subject to any disclaimer, the term of this patent is extended or adjusted under 35 U.S.C. 154(b) by 488 days.

(21) Appl. No.: 12/303,120

(22) PCT Filed: May 4, 2007

(86) PCT No.: PCT/GB2007/001657
§ 371 (c)(1),
(2), (4) Date: Mar. 20, 2009

(87) PCT Pub. No.: WO2007/141471
PCT Pub. Date: Dec. 13, 2007

(65) Prior Publication Data
US 2010/0017614 A1 Jan. 21, 2010

(30) Foreign Application Priority Data

Jun. 6, 2006 (GB) .................................. 0611128.0
Oct. 23, 2006 (GB) .................................. 0621093.4

(51) Int. Cl.
*H04N 7/167* (2011.01)
*H04L 9/00* (2006.01)
*H04L 9/32* (2006.01)
(52) U.S. Cl. ......... 380/210; 380/232; 380/262; 713/176
(58) Field of Classification Search ............... 380/1–287
See application file for complete search history.

(56) References Cited

U.S. PATENT DOCUMENTS 5,742,294 A * 4/1998 Watanabe et al. ............. 345/672
(Continued)

FOREIGN PATENT DOCUMENTS

GB 2 408 873 6/2005
(Continued)

OTHER PUBLICATIONS

Wu, Min et al., "Data Hiding in Image and Video: Part I—fundamental Issues and Solutions", IEEE Transactions on Image Processing, vol. 12, No. 6, pp. 685-695, (2003).

(Continued)

*Primary Examiner* — Shin-Hon Chen
(74) *Attorney, Agent, or Firm* — Oblon, Spivak, McClelland, Maier & Neustadt, L.L.P.

(57) ABSTRACT

An encoding data processing apparatus generates a video material item marked copy by embedding a payload data word into the video material item. The video material item includes plural video frames. A code word generator generates a water mark code word from the payload data word and reads data representing the water mark code word into a shuffle data store. A shuffle processor generates pseudo randomly at least one address within an address space of the shuffle data store for each video frame and reads data representing part or parts of the water mark code word out from the data store at locations identified by the pseudo randomly generated address. A data embedding processor receives the video material item and embeds the data representing the part or parts of the water mark code word read out from the shuffle data store for each frame into a corresponding frame of the video material item.

17 Claims, 9 Drawing Sheets

U.S. PATENT DOCUMENTS

| | | | |
|---|---|---|---|
| 6,256,393 B1 * | 7/2001 | Safadi et al. | 380/232 |
| 6,546,113 B1 | 4/2003 | Lucas et al. | |
| 2003/0059083 A1 | 3/2003 | Umeda et al. | |
| 2004/0010692 A1 * | 1/2004 | Watson | 713/176 |
| 2004/0234099 A1 | 11/2004 | Venkatesan et al. | |
| 2004/0247126 A1 * | 12/2004 | McClellan | 380/262 |
| 2005/0271246 A1 * | 12/2005 | Sharma et al. | 382/100 |
| 2007/0098158 A1 | 5/2007 | Tapson | |
| 2007/0183594 A1 | 8/2007 | Russell | |

FOREIGN PATENT DOCUMENTS

| | | |
|---|---|---|
| GB | 2 419 764 | 5/2006 |
| WO | 98 03014 | 1/1998 |
| WO | 2005 091547 | 9/2005 |
| WO | WO 2005091547 A2 * | 9/2005 |
| WO | 2005 114571 | 12/2005 |

OTHER PUBLICATIONS

"Announcing the Advanced Encryption Standard (AES)", Federal Information Processing Standards Publications 197, pp. i-iii, 1-3 and 5-47, XP-002452709, (2001).

U.S. Appl. No. 12/303,338, filed Dec. 3, 2008, Keating, et al.

U.S. Appl. No. 12/301,563, filed Nov. 19, 2008, Russell, et al.

U.S. Appl. No. 12/274,836, filed Nov. 20, 2008, Keating, et al.

* cited by examiner

Fig. 3

ENCODING AND DETECTING APPARATUS

FIELD OF INVENTION

The present invention relates to encoding data processing apparatus and methods for generating marked copies of material items by representing a payload data word into copies of the material items.

Correspondingly, the present invention also relates to detecting data processing apparatus and methods operable to detect code words, which may be present in marked material items.

The present invention also relates to media terminals for generating marked copies of material items for reproduction. In some applications, the material items may be video material items, and the media terminal may form part of a digital cinema projector.

BACKGROUND OF THE INVENTION

Generally, a technique for embedding data in material to the effect that the embedded data is perceptible or imperceptible is referred to as watermarking. Code words are applied to copies of material items for the purpose of identifying the copy of the material item or for conveying data represented by the code words. In some applications, watermarking can provide, therefore, a facility for identifying a recipient of a particular copy of the material.

A process in which information is embedded in material for the purpose of identifying a specific copy of the material is referred to as finger printing. A code word, which identifies the material, is combined with the material in such a way that, as far as possible, the code word is imperceptible in the material. As such, if the material is copied or used in a way, which is inconsistent with the wishes of the owner, distributor or other rights holder of the material, the copy of the material can be identified from the code word, so that the right holder can take appropriate action. The code word is therefore used to convey a payload data word, which can be used to identify uniquely the copy of the material. In the following description and claims, the term "water mark" and "finger printing" may be used interchangeably, particularly in respect of the encoding and detection techniques disclosed.

In co-pending UK patent application number 0327854.6 an encoding data processor is disclosed for application to for example digital cinema in which payload data having two or more fields is represented by watermarking an image with one or more code words. Each value of a first field of a payload data word is associated with a first code word, and each value of a second or subsequent data field is represented by a second code word, which is selected in dependence upon the value of the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field.

The first and second fields can be assigned to different associated parameters such as for example address parameters. The first field could therefore identify the country of distribution of the material, whereas the second field could identify a particular distribution outlet within the country. A watermarking or finger printing system can be formed for identifying a point of distribution of copies of video material.

UK patent application number 0424225.1 discloses an apparatus and method for embedding a payload data word into video images for application to digital cinema. The payload data word includes a data field providing a representation of a date and time of reproduction of the video images, and a data field providing a representation of an identifying code-word of the projector.

Generally, it is desirable to reduce a likelihood of an embedded code word being detectable. If a code word is detected, the payload data word may be determined. As a result the watermarking system could be compromised by attackers wishing to remove a code word or to include a false code word to disrupt detection of the payload data.

SUMMARY OF INVENTION

According to an aspect of the present invention there is provided an encoding data processing apparatus for generating a marked copy of a material item by embedding a payload data word into the material item. The material item includes a plurality of data frames. The encoding data processing apparatus comprises a code word generator, a shuffle processor and an embedding data processor. The code word generator is operable to generate a water mark code word from the payload data word and to read data representing the water mark code word into a shuffle data store. The shuffle processor is operable to generate pseudo randomly at least one address within an address space of the shuffle data store for each of the frames and to read data representing part or parts of the water mark code word out from the data store at locations identified by the randomly generated address. The data embedding processor is operable to receive the video material item and to embed the data representing the part or parts of the water mark code word read out from the shuffle data store for each frame into a corresponding frame of the video material item.

Embodiments of the present invention can provide an arrangement in which parts of a code word are stored in a shuffle data store and read out pseudo randomly for combining with the material item. As such, by randomly embedding different parts of the code word into each frame of the material item, a likelihood of an attacker being able to identify the code word within the video material item is substantially reduced. Security of the payload data word represented by the water mark code word is therefore improved.

In some examples, the water mark code word is formed from a plurality of encrypted data streams. As such, by embedding data representing parts of the plurality of encrypted data streams pseudo randomly read out from the shuffle data store by the shuffling processor, a likelihood of an attacker being able to identify the code word in the marked copy of the material item is reduced.

Video images are one example of material, which can be protected by embedding a digital code word. Other examples of material, which can be protected by embedding a code word, include still image, audio data, software programs, digital documents (optionally reproduced on paper or other media) and any other information-bearing signal.

According to an aspect of the present invention there is provided a detecting data processing apparatus operable to detect a payload data word embedded within a marked copy of a material item by the encoding data processing apparatus. The detecting data processing apparatus comprises a recovery processor, an address generator, a code word regenerator, a correlator and a control processor. The recovery processor is operable to generate, for each data frame of the material item, data representative of an estimate of part or parts of a water mark code word embedded by the encoding data processing apparatus into each frame of the image. The address generator is operable to generate pseudo randomly at least one address within an address space of a shuffle data store for each of the frames and to read the data representing the estimate of the part or parts of the water mark code word into the shuffle data store at locations identified by the pseudo randomly generated address. The address generator is arranged to generate the same address for each frame as those generated by the encoding data processing apparatus. A code word generator is operable under control of the control processor to regenerate each of a plurality of possible code words which may have been embedded within the video material item. The correlator is operable under control of the control processor to detect the code word corresponding to the code word which has been embedded to form the marked version of the material item, by correlating the re-generated code word with the estimate of the code word read out from the shuffle data store. The control processor is operable to recover the payload data word for the code word detected as a result of the correlation.

A detecting data processing apparatus according to embodiments of the invention can provide an arrangement for performing a reverse shuffle effect, to re-generate the pseudo random addresses corresponding to those generated by the encoding data processing apparatus so as to read into the shuffle data store in the detecting apparatus the parts of the code word recovered from each frame of the material. In effect therefore a reverse operation of the shuffling of the code word which was performed by the encoding data processing apparatus is made at the detecting data processing apparatus so that the shuffle data store is reproduced in an equivalent form to that in the encoding data processing apparatus. Thus the control processor can read out the re-formed code word from the shuffle data store to feed the code word to the correlator in order to determine which code word has been embedded to thereby recover the payload data word.

Various further aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which:

FIG. 3 is a schematic representation illustrating a further example of initial values for generating encrypted data streams for embedding in a video image using the encoding data processing apparatus shown in FIG. 1;

DESCRIPTION OF EXAMPLE EMBODIMENTS

General Encoder

Figure 1:
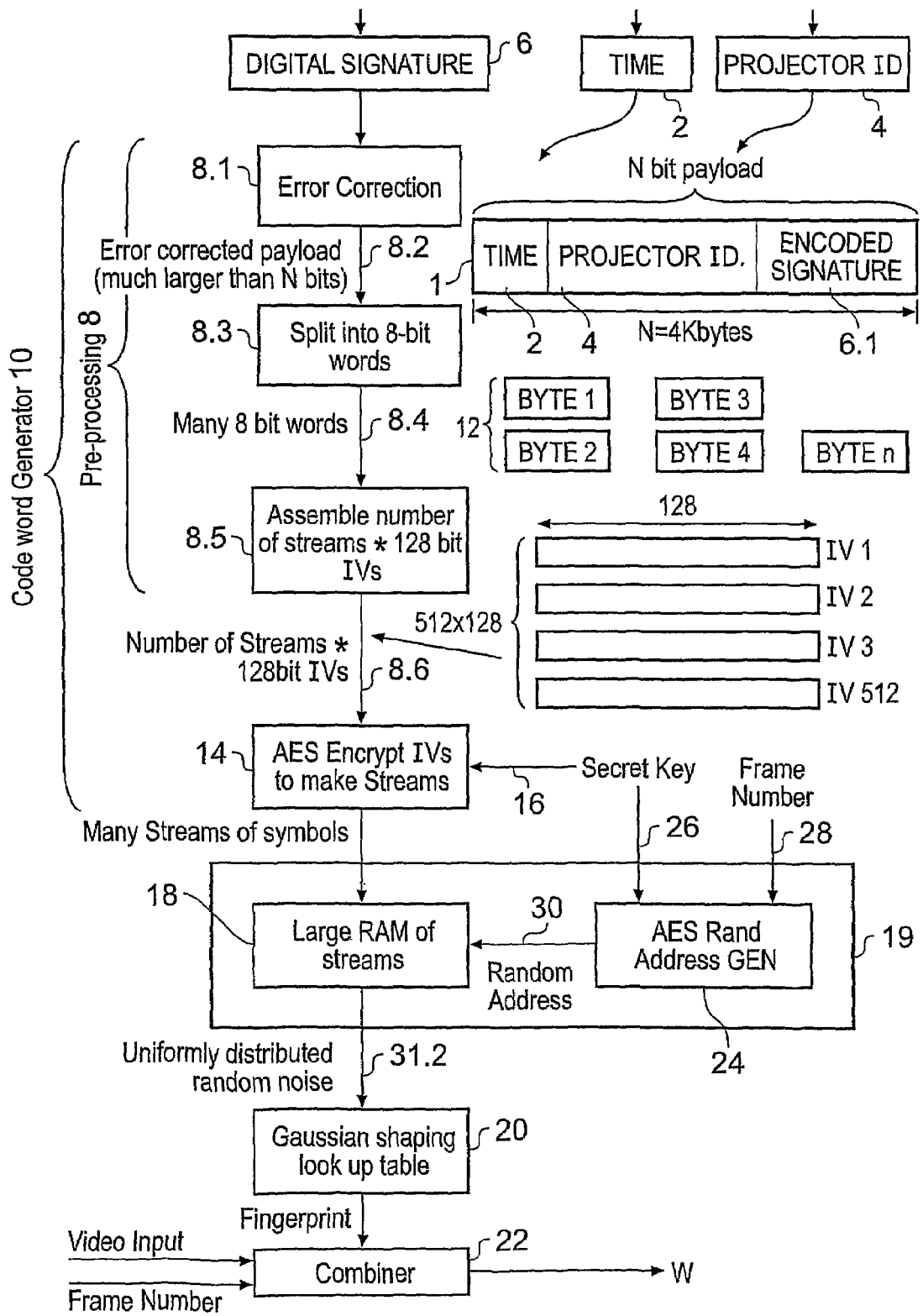
FIG. 1 is a schematic block diagram of an encoding data processing apparatus for combining a payload data word with a video material item to form a marked version of the video material item.

An encoding data processing apparatus according to an example embodiment of the present technique is shown in FIG. 1. FIG. 1 illustrates an example application of the present technique, in which the information material to which data is embedded is video material. In FIG. 1 a payload data word 1 includes a field indicating a time of generation of the payload 2, a projector identifier 4 and a digital signature field 6, which is to be embedded for example by a video projector into a video signal comprising a plurality of video frames. The payload data word 1 may be as long as 4 kbits. The digital signature 6 is passed through an error correction encoder 8.1, which forms an error correction encoded digital signature 6.1, which is combined with the time data 2 and the projector identifier 4 to form a payload data word 1 comprising N-bits. The N-bit payload data word is then fed on a channel 8.2 to a data word splitter 8.2, which is arranged to split the N-bit data word into each of a plurality of 8-bit bytes 12. As shown in FIG. 1 there are n-bytes 12. The bytes 12 are then passed via a connecting channel 8.4 to an initial value former 8.5, which forms a number of initial values for use in generating encrypted data streams. Each of the data streams is formed from an initial value. In one example each initial value is 128-bits in length.

In the present example shown in FIG. 1, 512 initial values are formed, which are used to form 512 streams. Thus, at the output of the initial value former 8.5 on a connecting channel 8.6 there is provided 512×128 bit initial values from which will be formed 512 different encrypted data streams providing a water mark code word for embedding. The formation of the initial values, from which encrypted data streams are formed, will be described in more detail shortly with reference to FIG. 2.

In FIG. 1 each of the initial values is received by an encryption processor 14 which also receives a payload key via an input channel 16. The encryption processor 14 may be an AES encryption processor encrypting the initial values in accordance with an encryption algorithm known as "Rijndael" encryption. The encryption processor 14 receives each of the 128 bit initial values and generates for each initial value an encrypted data stream comprising 512 8-bit coefficients. This is done by feeding back an output from the encryption processor 14 to the input repeatedly a number of times in order to produce, for each encrypted data stream 512×8-bit coefficients. In one example there are 512 encrypted data streams, so that the water mark code word is formed from 512×512 8-bit coefficients, which represents the N-bit payload data word. The error correction encoder 8.1, the data word splitter 8.3, the initial value former 8.5 and the encryption processor 14 together form a code word generator 10. The encrypted data streams are then stored in a shuffle data store 18, which forms part of a shuffle processor 19. The encrypted data streams are read out in blocks of 8-bit words from the shuffle data store 18, which are passed to a Gaussian shaping look up table processor 20 before being combined with a frame of the video signal by a combiner 22 to form at the output of the combiner a watermarked video signal W. The combiner is arranged in one example to add the coefficients of the water mark code word to corresponding samples of the video material item.

Returning to the shuffle data store 18, according to the present technique, the shuffle processor 19 is arranged to read out the water mark code word formed from the encrypted data streams substantially randomly for embedding in the frames of the video material. To this end, an address of the shuffle data store 18 for reading out the encrypted data stream is generated by a random address generator 24. The random address generator 24 generates for each frame of the video input signal a random address, which selects randomly parts of the 512 encrypted initial values. In one example, the random address generator 24 is arranged to generate the address using an encryption algorithm, so that not only is the address generated randomly, but the address is generated in a way which does not allow a pattern of the addresses generated to be easily identified.

For the example shown in FIG. 1, the address generator 24 receives the same payload encryption key on an input channel 26 as the encryption processor 14 received on the input channel 16. The random address generator 24 also receives a frame number of the input video signal on an input channel 28. Thus by generating addresses randomly within the address space of the encrypted shuffle data store 18 as produced at an output 30 of the encrypted random address generator 24, parts of the streams maybe read out of the shuffle data store 18 and passed through the Gaussian shaping look up table before being combined with a frame of the video material by the combiner 22.

In some examples, the frame number may be generated by the encoder itself, which may be re-cycled over a predetermined period, for example 1024. However, in this case the decoder must search over the predetermined period of the count (for example 1024) in order to align the frames of an original version of the material with those of a suspected un-authorised version of the material. In other examples the frame number may be provided with the input video material.

The shuffle data store 18 is arranged to store the encrypted data streams and the shuffle processor 19 is arranged to shuffle the streams for embedding into the video image frames. In one example, a fraction of the content of the data store is randomly selected and embedded into each frame of the video signal. For example, for each of 512×128-bit initial values, a 512×8-bit encrypted stream is produced. Thus the shuffle data store is arranged to store 512×512×8-bit bytes, which is 262144 bytes. The shuffle processor 19 is operable to read out ⅛-th of the shuffle data store for each frame, which is 32678 bytes, so that the combiner 22 can embed the 32678 bytes in each frame.

In accordance with the present technique because the encryption data streams are read out randomly from the shuffle data store 18 and embedded in a corresponding frame of the video material, a likelihood of an attacker determining and identifying a particular input data stream from the watermarked video signal is substantially reduced. Furthermore, passing the encrypted data streams through a Gaussian look-up table, has an effect of making the encrypted data streams appear more noise like and therefore less likely to be detected.

Formation of the Initial Values

Figure 2:
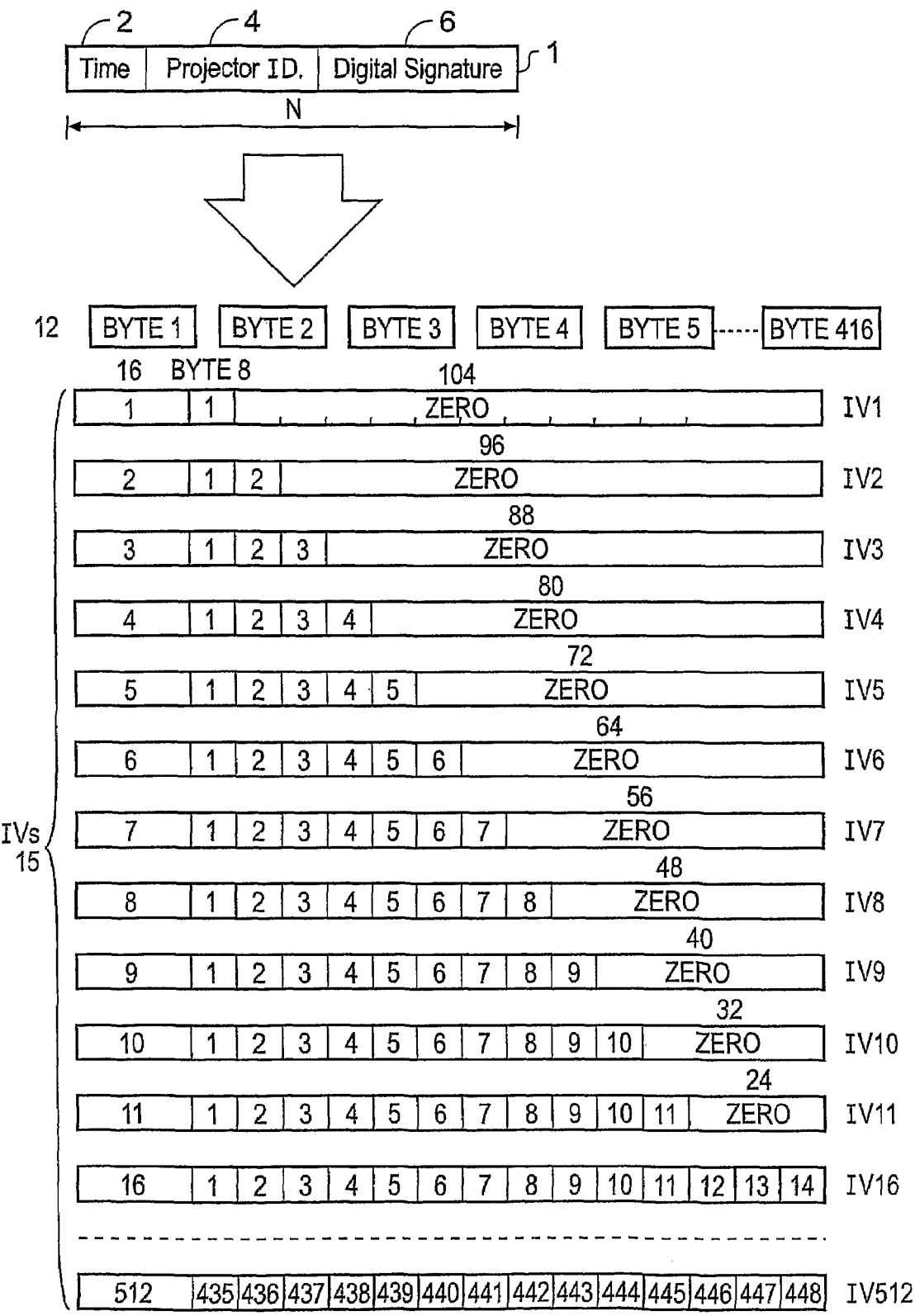
FIG. 2 is a schematic representation illustrating a formation of initial values for generating encrypted data streams for embedding in a video image using the encoding data processing apparatus shown in FIG. 1.

As will be explained shortly, advantageously the encrypted data streams may by substantially orthogonal with the effect that the detection of one of the data streams with respect to the other data streams by correlation can be effected with reduced interference from the other data streams. A formation of the encrypted data streams will now be described in more details with reference to FIG. 2. In FIG. 2 the payload data word comprising N bits 1 is shown as received at the output of the error correction encoder 8.1 in FIG. 1. The N bit encrypted data word is then split by the data word splitter 8.3 into bytes 12. In one example there are 416 bytes which can be conveyed within the 512 encrypted data streams.

As shown in FIG. 2 each of the encrypted data streams is formed from the initial values 15 by writing bytes of the payload into each of the initial values in accordance with the formula identified above and repeated below:

$$IV_n = \Sigma_{l=0}^{l=n-1} \text{byte}(n-l)$$

As shown in FIG. 2 each of the initial values includes 128 bits, 16 bits being assigned to a field index. The field index includes the number of the initial value which therefore represents the value of the data stream. As shown in FIG. 2 the first initial value $IV_1$ which is numbered 1 in the 16 bit field, has byte 1 with the remaining 104 bits being set to a predetermined value such as zero. In accordance with the above formula the second initial value $IV_2$ which is numbered 2 in the index field includes bytes 1 and 2 with the remaining 96 bits set to zero. Thus, to form the next initial value the subsequent byte is concatenated with all the previously processed bytes. The number of zeros which remain is slowly reduced down to zero in a final initial value of a first set of 16 which will be intermediate number 16. Thus, each set of IV values includes a corresponding set of bytes shown in the table below:

| Streams | Bytes of Payload |
| --- | --- |
| 1 to 16 | 1 to 14 |
| 17 to 32 | 15 to 28 |
| 33 to 48 | 29 to 42 |
| 49 to 64 | 43 to 56 |
| --- | --- |
| 496 to 512 | 435 to 448 |

Thus, as shown in FIG. 2 the final initial value number 512 will include bytes numbered 435 to 448.

As shown in FIG. 1 each of the initial values is then encrypted to form a 512×8-bit encrypted data stream, which is then read into the shuffle data store for reading out and combining with a frame of the video material. Thus in one example, each frame of the video material will include random parts of all of the encrypted data streams, the encrypted data streams being thereby effectively shuffled with respect to each frame of the video signal.

In accordance with the present technique forming the encrypted data streams from the initial values shown in FIG. 2 provides an advantage because the encrypted data streams can be made substantially orthogonal. Each of the encrypted data streams is made substantially orthogonal with respect to one another as a result of two properties, which are that firstly the streams are encrypted and secondly that the length of each of the data streams is sufficiently long to appear substantially "random-like". Encrypting the data streams as part of their generation has an effect that a change of one bit in the initial value input to the encryption circuit has an effect of producing a very different encrypted data stream with respect to the encrypted stream, which would have been generated for the unaltered initial value. Furthermore, by arranging for the encrypted data streams to be sufficiently long, the patterns of data bits within each stream can be made to appear more random like.

According to the present technique, by forming the initial values in the way set out above, the detection of byte 1 can be used to detect byte 2. The detection of byte 1 will require only $2^8$ correlations. When detecting byte 2, a correlation can be performed for all possible values of byte 2 only, since byte 1 which is also present will then be known. The detection of byte 2 can therefore be made also with only $2^8$ correlations, so that the detection of bytes 1 and 2 will require only $2 \times 2^8$ correlations as opposed to $2^{16}$ correlations, which can therefore be made more easily. As will be explained shortly therefore, by recovering each byte of the payload starting with the first and successively increasing the parts of the payload recovered by increasing the initial value number which is searched from 1 to 16, an amount of processing which is required in order to detect successfully all 14 bytes from the first 16 initial values is reduced to a practical level. Correspondingly the next 14 bytes from the subsequent 16 initial values can be recovered until the entire payload is recovered. For each byte to be detected by the detecting data processor only $2^8$ possible correlations are required as opposed to $2^{4096}$ to detect the 4096-bits of a payload data word by correlation, which could otherwise be prohibitively computationally difficult.

Since the payload data word includes a digital signature 6, if the recovered digital signature is authenticated then the payload can be considered to have been successfully recovered. It is for this reason that error correction encoding can be applied to the digital signature, whereas error correction encoding is not applied to the projector identifier (ID) or the time stamp. Adding error correction to the projector ID and the time stamp may compromise the integrity of a false positive detection probability or false negative detection probability which is established to prove the presence of the water mark payload for a finger printing system. However, since the digital signature is self authenticating, in that if the digital signature is authenticated with a corresponding private key of the digital signature private key/public key pair, then it must be the digital signature concerned, without a need to rely on the integrity of the watermarking arrangement which conveyed that code word. Therefore, error correction can be applied to the digital signature to improve a likelihood of recovering the digital signature.

Further Example of Initial Values

Figure 3:
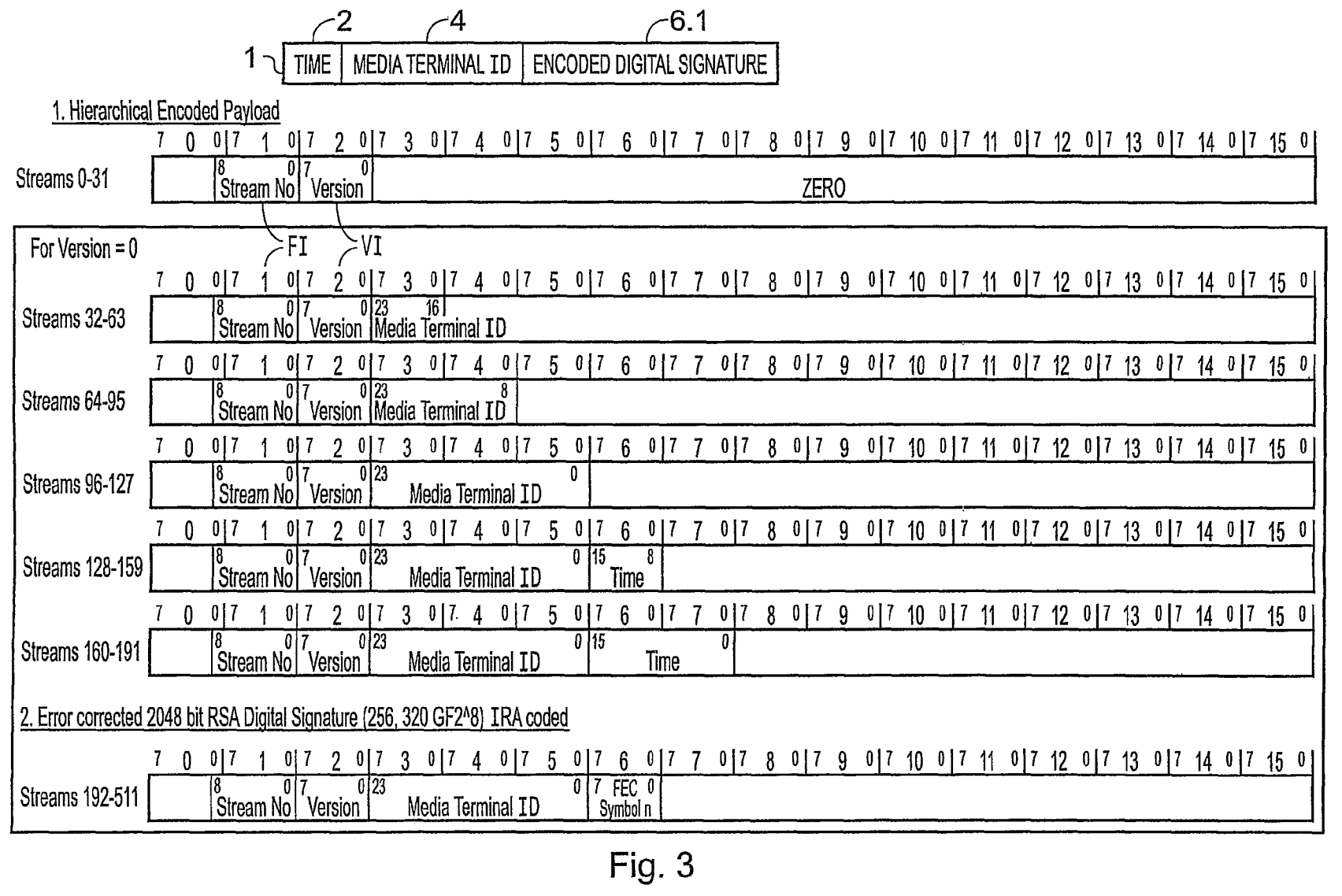

FIG. 3 provides a further example illustrating one possibility for generating the initial values for use in the encoding data processing apparatus. In FIG. 3 as for FIG. 2 there are 512 initial values for forming 512 encrypted data streams. As shown in FIG. 3 a field index for identifying the 512 encrypted data streams is provided by a nine bit data field FI to identify each of the 512 initial values for forming the encrypted streams. Since the field index FI providing a stream number comprises nine bits, a remaining seven bits of the first two bytes are set to zero or any other predetermined value, which is known at the decoder. In a third byte in each of the 512 initial values a version identifier VI is provided. The version identifier provides a byte of data indicating a version of the fingerprinting scheme which can be identified at the decoder. The decoding process can be therefore matched to the encoding process established for a particular version. Accordingly, future changes in the fingerprinting/water marking technique can be accommodated within a data structure provided by the initial value shown in FIG. 3.

In FIG. 3 the first 32 initial values providing encrypted data streams 0 to 31 are formed from the same format, that is to say as shown in FIG. 3 with only the version provided in the version identifier VI field and the remaining bytes 3 to 15 set to a predetermined value such as zero. Since all 32 streams for initial values 0 to 31 will only contain the version identifier VI, there is a greater likelihood of a decoder being able to detect the version identifier and therefore identify the correct version number for the decoder. As will be explained shortly, each of the initial values produced by streams 0 to 31 will produce a different encrypted data stream, which will be separately detected to identify the same version number to thereby confirm the value of the version number.

In order to avoid streams 0 to 31 producing the same encrypted data stream which is added to the video material items, the stream number is provided in the field index FI, which is changed to identify each of the initial values. As a result since each initial value will have a different stream number, a result of passing the initial value through an encryption circuit will produce a different encrypted data stream. Thus, each of the resulting encrypted streams produced by the initial values 0 to 31 will produce different encrypted data streams, which can thereby be more easily detected by correlation, even though each initial value otherwise conveys the same payload.

By arranging for the initial values to each be of a predetermined length and setting the predetermined length to as long as possible, an improvement is provided of a likelihood of detecting each of the encrypted data streams by correlation. This is because, whilst an encrypted data stream will correlate with itself producing a high correlation output value, the other encrypted data streams and the video image frame should preferably produce a low correlation output value so that as far as possible these other encrypted data streams and the video image data appear as noise with respect to a wanted encrypted data stream during correlation. The unwanted encryption data streams will produce a lower correlation value for longer encrypted streams. Thus, by setting the initial values to a predetermined length which is long enough to cause a correlation with unwanted encrypted data streams to be a substantially low value, a likelihood of successfully detecting the wanted encrypted data stream is increased.

As shown in FIG. 3, after the first 32 initial values (streams 0 to 31) the next 159 initial values are arranged in a hierarchically encoded form as illustrated for the example in FIG. 2. Thus, streams 31 to 63 will include byte 1 of the media terminal ID from the data field 4 of the payload word 1. The next streams 64 to 95 will include both the first and second bytes of the media terminal ID in bytes 3 and 4 of the initial value and the next set of initial values 96 to 127 will include the three bytes of the projector ID in bytes 3, 4 and 5. Streams 128 to 159 will include the first byte of the time stamp in byte number 6 and streams 160 to 191 will include the two bytes of the time stamp in bytes 6 and 7.

In FIG. 3 although the media terminal ID is provided in bytes 3, 4 and 5 of streams 192 to 511, each byte of the encoded 2048 bit RSA digital signature is provided successively in byte 6. Thus the encoded digital signature is divided into bytes and each of those bytes is included in a different one of the streams 192 to 511. Thus, unlike the example shown in FIG. 2, a successive introduction of each of the bytes of the data stream to each of the other bytes of the data stream being included in each initial value is not adopted for the encoded digital signature.

The hierarchical encoding arrangement provided for the initial values 32 to 191 for the media terminal ID and the time stamp is provided in order to remove an ambiguity in a situation where more than one payload data word is present in a watermarked copy of a video material item. For an example in which a collusion attack has taken place in which an attacker combines two versions of the same watermarked image, each being produced from a different digital projector, detecting each byte from for example the first set of streams 31 to 63 may produce two detected bytes. If the next set of streams were to identify the second bytes of for example media terminal ID without the presence of the first byte there would be some ambiguity in the order of those two bytes within the material. In order to avoid this ambiguity the hierarchical encoding arrangement shown in FIGS. 2 and 3 for the initial values is provided. Since both bytes 1 and 2 will appear in the second set of streams 64-95 then this ambiguity is resolved because the order of these bytes can be identified from the detected data streams 64-95.

Figure 4:
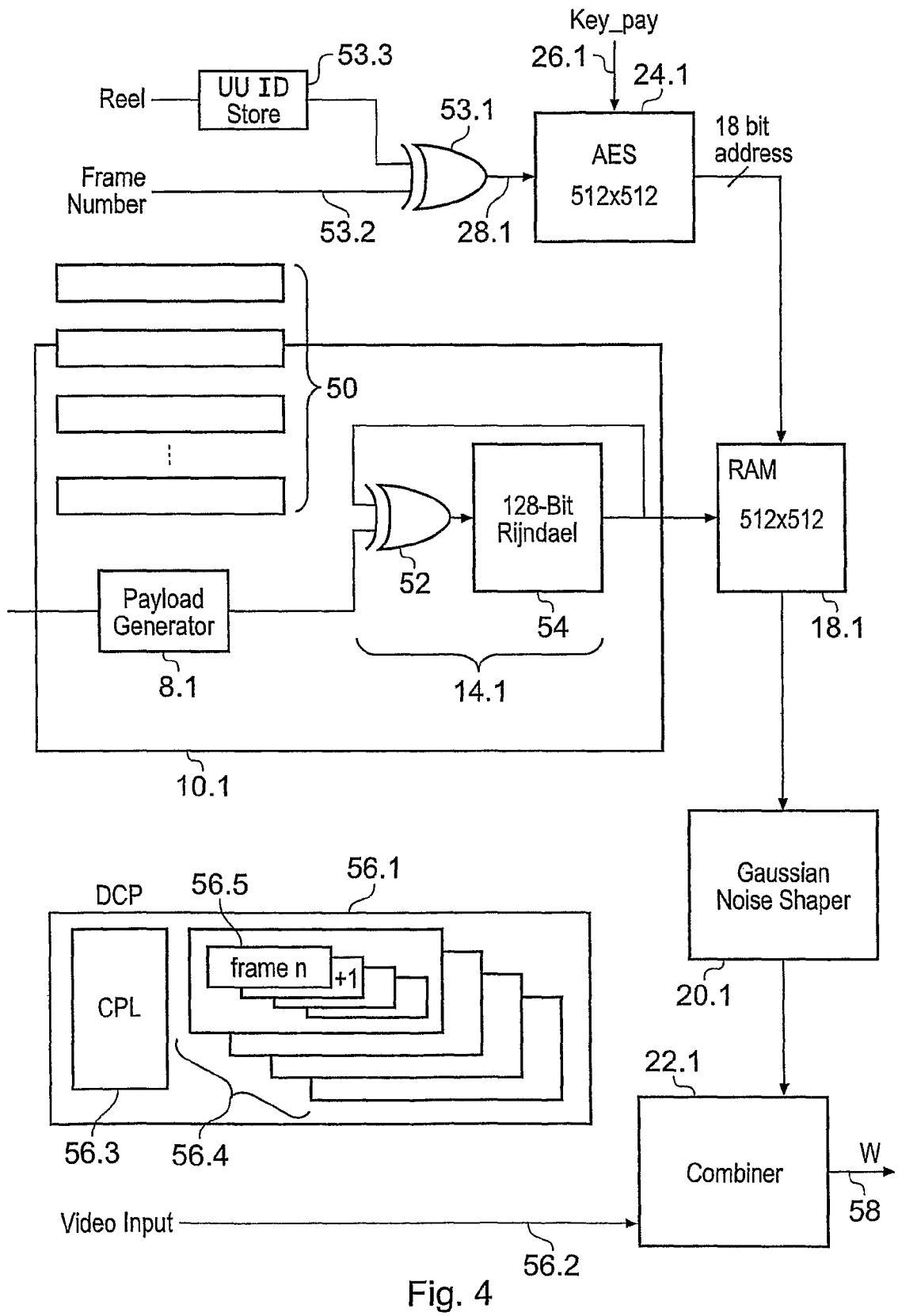
FIG. 4 is a schematic block diagram of a further example of an encoding data processing apparatus for combining a payload data word with a video material item to form a marked version of the video material item.

The ambiguity in the order of the detected bytes is not so relevant to detecting the digital signature. This is because since a digital signature can be uniquely identified with a corresponding key of a private key/public key pair, although there may be some ambiguity in the order of the bits, if one of these orders of the bits correctly identifies a digital signature then that digital signature will, with a very high likelihood, correctly identify the authenticity of that digital signature. As such, for the example of FIG. 3, the hierarchical encoding of the initial values is not used for encoding the digital signature.
Further Examples of Encoders An example encoding processor in accordance with the present technique is shown in FIG. 4. In the example shown in FIG. 4, the input video material is provided as a content data file in accordance with a format, which can be used for with digital cinema. A data file known as a digital cinema package file (DCP) is communicated to a digital cinema projector for reproduction. The DCP file 56.1, which includes audio information, video information as well as data is received on an input 56.2 of a combiner 22.1, after being de-compressed and decrypted (not shown). The DCP file 56.1 includes a content play list CPL 56.3 as well as content data representing the audio/video information. The content data is provided as a plurality of reels 56.4 each of which provides approximately 10 minutes of audio/video information when reproduced and is itself encrypted. Each reel 56.4, includes a plurality of frames 56.5. The CPL 56.3 provides for each of the reels provided in the DCP a list of UUID identifying the reels which are to be reproduced by the digital cinema projector. Thus, the CPL allows, for each reel (portion of the video content) a number of frames to be determined for each reel, which are to be reproduced.

In FIG. 4 the error correction encoding, the data splitting and the formation of the initial values shown in FIG. 1 are referred to as pre-processing 8 which are performed by a payload generator 8 shown in FIG. 4. Thus, in correspondence with the operation shown in FIG. 1, the payload generator 8 generates a plurality of initial values 50 which are fed to a first input of an XOR circuit 52. In FIG. 4 encryption of the 128 bit initial values is performed by a Rijndael algorithm (also referred to as an AES) formed by an encryption processor 54 (which could also be used as the encrypting processor 24.1), which in combination with the XOR circuit 52 generates the encrypted data streams by feeding back the output from the Rijndael processor 54 to a second input of the XOR circuit 52. Thus, in correspondence with the encoder shown in FIG. 1, the XOR circuit 52 and the Rijndael processor 54 form an encryption data processor 14.1 and the encryption processor 14.1 and the payload generator 8 form a code word generator 10.1. By passing the 128 bit initial values thirty two times through the Rijndael encryption processor 54 and XOR circuit 52, the 512 8-bit values for each of the encrypted data streams are formed and fed into an shuffle data store 18.1. In correspondence with the arrangement shown in FIG. 1, a shuffle processor 24.1 includes a random address generator, which uses an AES algorithm processor performing the Rijndael algorithm and receives the frame number of the video input signal on an input channel 28.1 and a payload encryption key on an input channel 26.1. The shuffle processor 24.1 forms a random 18-bit address which is used to address the shuffle data store 18.1. As with the operation of the encoder shown in FIG. 1, to make the embedded data more noise like, the encrypted data stream read out from the data store 18.1 is passed through a Gaussian noise shaper 20.1 and embedded by a combiner in a frame of the video input signal 56 to produce a watermarked output video signal on an output channel 58.

In contrast to the example encoding data processing apparatus shown in FIG. 1, the encoding data processing apparatus shown in FIG. 4, determines a frame number from the CPL 56.3 and the reel UUID provided in the CPL 56.3 of the DCP to form an initial value for the AES algorithm processor 24.2. Thus as shown in FIG. 4, an XOR gate 53.1 receives on a first input 53.2 the frame number determined for the reel, and on a second input 53.3, the UUID of the reel. As a result, an initial value for the Rijndael encryption processor is provided, which is unique for each frame and so generates a pseudo random address for the shuffle store 18.1. Furthermore, since the initial value for generating the address can be determined from the reel and frame number derived from the CPL, a projector can be re-started from the same position with the next initial value and therefore address, even if there is a temporary break down of the projector. Thus if the projector is re-started mid way through the audio/video content, a detector can still generate the same sequence of address which would have been used by the projector to recover correctly the sequence of addresses of the shuffle store for reconstructing the finger print code words. In addition providing the CPL to the detection data processing apparatus, there is no longer a requirement to search for an alignment of the frames between the original version of the material and the suspected un-authorised version.

Figure 5:
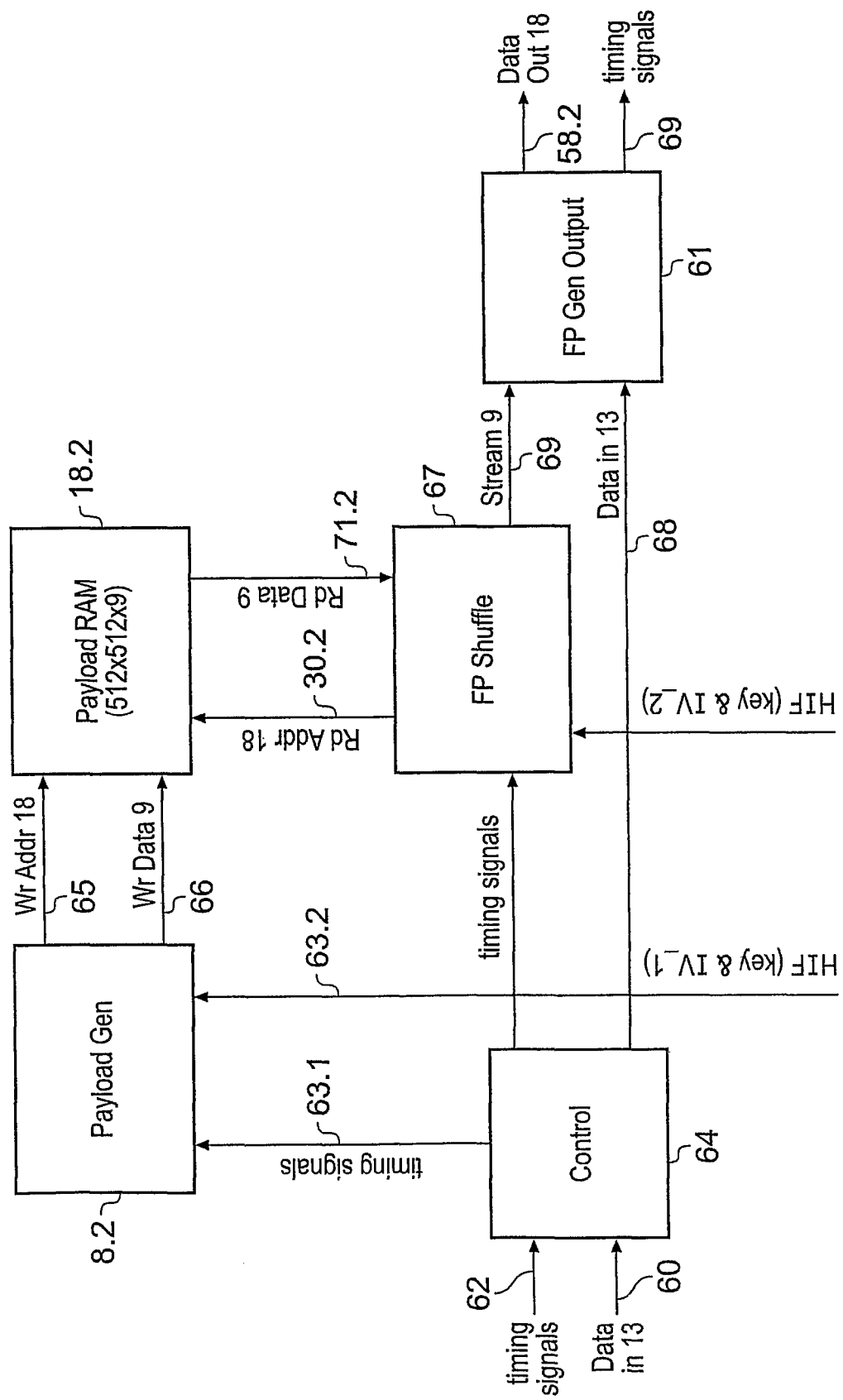
FIG. 5 is a schematic block diagram of a further example of an encoding data processing apparatus for combining a payload data word with a video image to form a marked version of the image.

A further example encoding data processing apparatus in accordance with the present technique is shown in FIG. 5. In FIG. 5 the video input signal is received on an input channel 60 with a timing signal received on an input channel 62. A control processor 64 passes the timing signal on to a payload generator 8.2 via a channel 63.1. The payload generator 8.2 operates in accordance with the payload generator 8 shown in FIG. 1 to perform the pre-processing operations 8, shown in FIG. 1. A second input to the payload generator passes the initial values on an input channel 63.2 which are generated in accordance with the example shown in FIG. 2.

The payload generator 8.2 generates a write address on a channel 65 and writes data on a channel 66 in order to store the encrypted data streams into a "payload RAM" forming a shuffle data store 18.2. A finger print shuffle processor 67 generates a random address using a random address generation processor such as that shown in FIGS. 1 and 3, and feeds the random address on a channel 30.2 to the shuffle data store 18.2 and reads out the data on a connecting channel 31.2. Thus, the finger print shuffle processor 67 provides parts of the water mark code word formed from the encrypted data streams or parts thereof to be combined with a corresponding frame of the video input signal. Before being combined with the video frame, the parts of the encrypted data streams are passed through an output generator 61, which forms at an output 58.2 the water mark code word for embedding in video frames W, using the timing signals are also output on a channel 69.

Payload Generator

Figure 6:
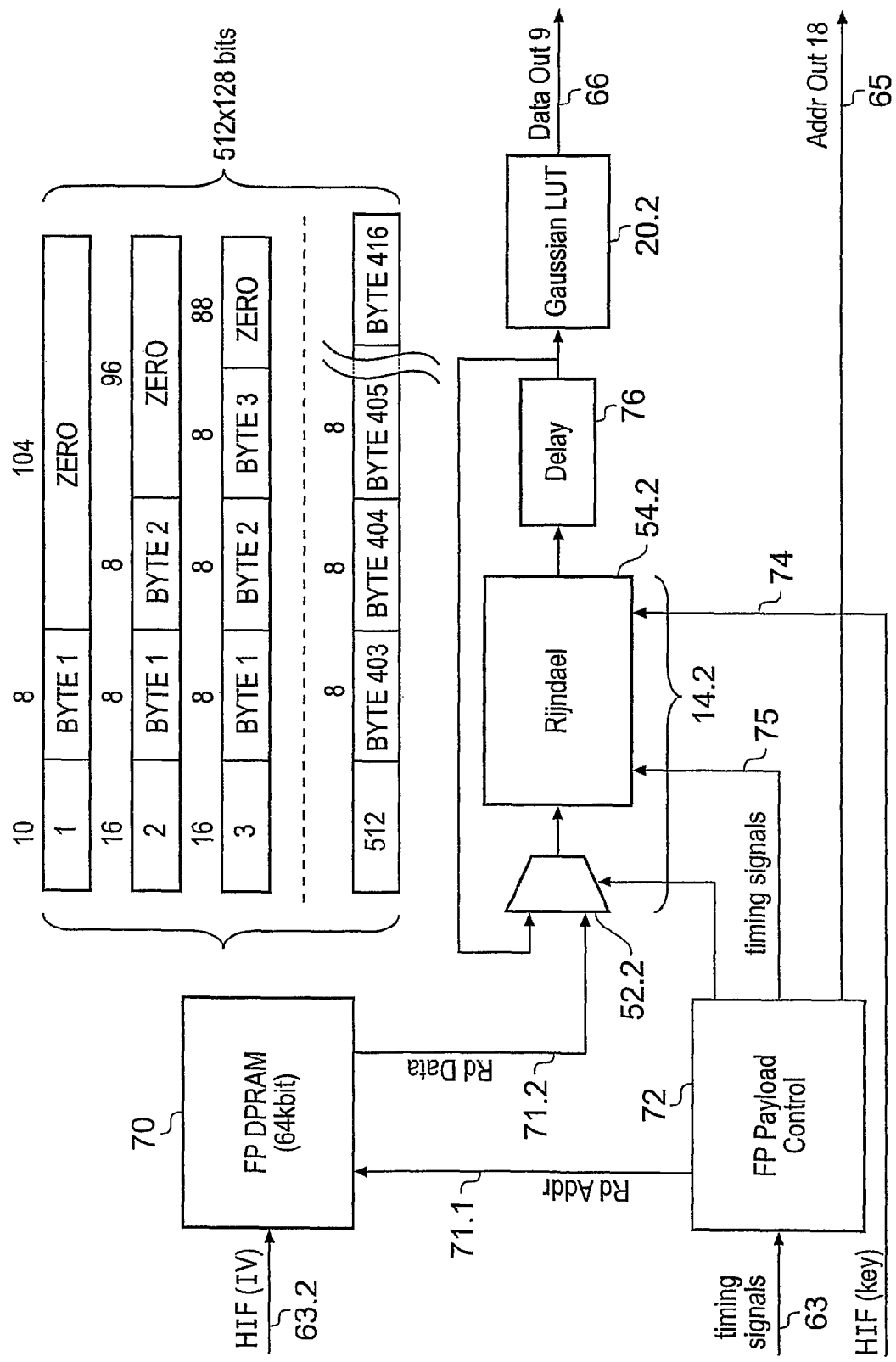
FIG. 6 is a schematic block diagram of a payload generation processor forming part of the encoding data processing apparatus show in FIG. 5.

An example of payload generator 8.2, which forms part of the example encoder shown in FIG. 5, is shown in FIG. 6. In FIG. 6 the initial values are received on the input channel 63.2 at a finger print memory 70, which receives on a first input 71.1 a read address and outputs on an output 71.2 an initial value for encryption to form a corresponding encrypted data stream. The timing signals received on the input channel 63 are passed to a frame processing payload control 72 which generates the write address for writing the generated encryption stream into the shuffle data store 18.2. The write address is generated on the output channel 65 and the encrypted stream is output on the output channel 66. The payload key is received by a Rijndael processor 73 on an input channel 74 in accordance with timing signals provided on an input channel 75 from the frame processing payload control circuit 72. The Rijndael processor 54.2 in combination with the XOR circuit 52.2 encrypts the initial values in accordance with the operation of the example encoder shown in FIG. 4, under control of the finger print payload control processor 72. A delay circuit 76 is provided in order to ensure that the initial values are correctly processed by the Rijndael processor 54.2. Finally, the encrypted data stream is passed through a Gaussian shaper 20.2, which operates in accordance with the Gaussian shaping processors 20 and 20.1 shown in the embodiments in FIGS. 1 and 3.

As shown in FIG. 6 the initial values which are stored in the finger print memory 70 are read out in accordance with the addresses generated by the finger print controller 72 to be fed through the Rijndael encryption apparatus formed by the XOR circuit 52.2, the Rijndael processor 54.2 and the delay 76, and output on the channel 66 after passing through the Gaussian shaper 20.2.

Finger Print Shuffle Processor

Figure 7:
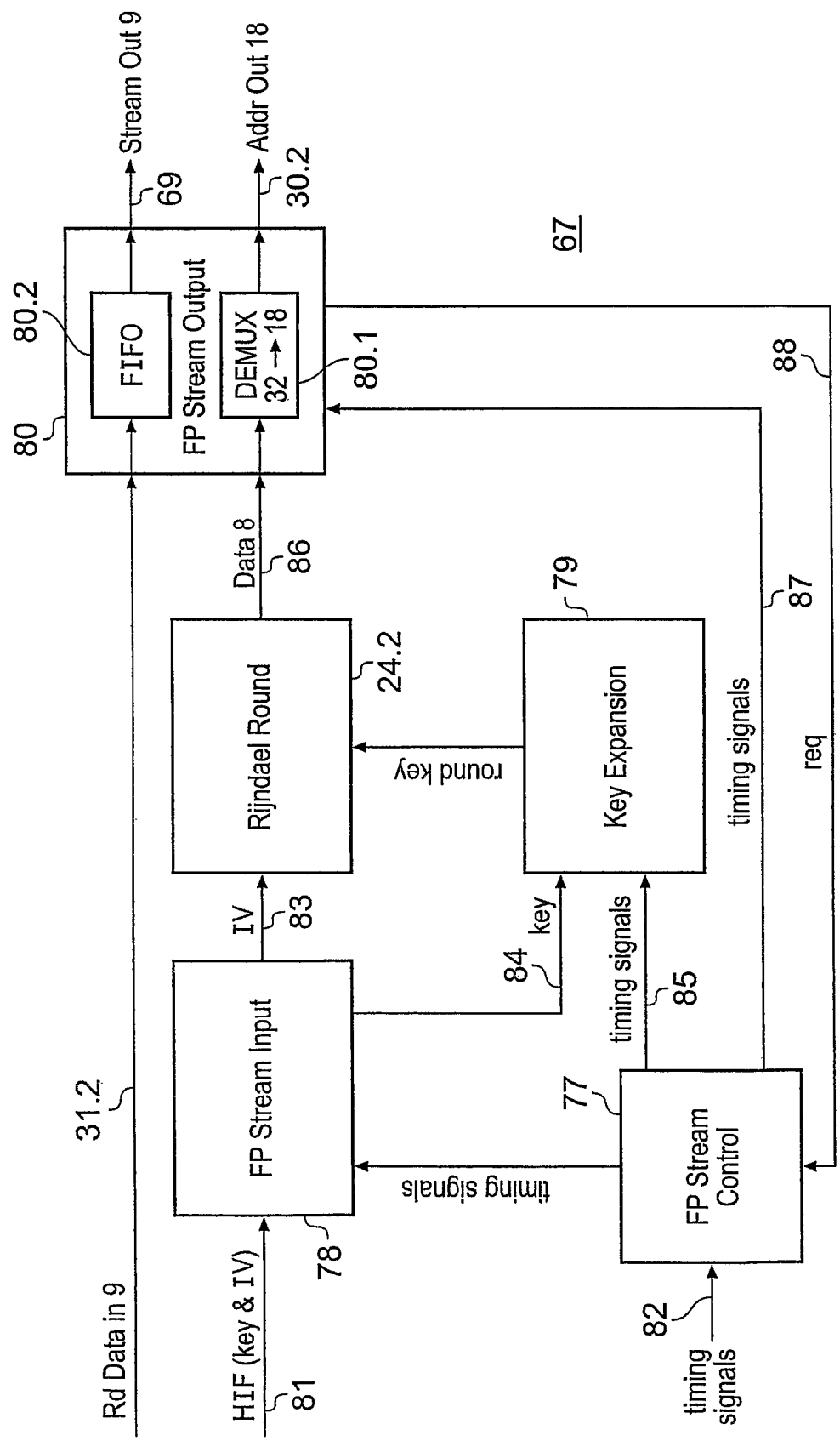
FIG. 7 is a schematic block diagram of a shuffle processor for generating a randomisation of the encrypted data streams which are combined with the video image by the encoding data processing apparatus of FIG. 5.

An example of the finger print shuffle processor 67, which appears in FIG. 5, is shown in FIG. 7. The finger print shuffle processor 67 performs a corresponding function to that of the shuffle processors 24, 24.1 shown in FIGS. 1 and 3. The finger print shuffle processor includes a finger print stream control unit 77, a finger print stream input 78, a Rijndael processor 24.2, a key expansion unit 79 and a finger print stream output unit 80. The finger print shuffle processor 67 receives the payload key and an initial value for forming the random address using the Rijndael round encryption processor 24.2 on an input channel 81. Timing signals are received by the frame processing stream control unit 77 via an input channel 82. The key and initial values received on the input channel 81 are split by the frame processing stream input unit 78 into an initial value which is passed on a channel 83 to the Rijndael processor 24.2 and a key which is passed via channel 84 to a key expansion unit 79. In accordance with the timing signals received via a channel 85 a key is extracted and passed to the Rijndael round processor 24.2, which generates a random address. The output of the Rijndael round processor 24.2 is a random address which is received at a finger print stream out processor 80 via a channel 86 for outputting as an 18-bit address on the output channel 30.2. A 32-to-18 bit de-multiplexer converts a 32-bit address provided by the Rijndael round processor 24.2 into an 18 bit address for output on the connecting channel 30.2. A FIFO buffer 80.2 buffers each encrypted data stream read out from the encrypted stream store 18.2, shown in FIG. 5, via channel 31.2 to be output from the finger print shuffle processor via the output channel 69. Control and timing is made using timing signals received from the finger print stream control processor 77 on a channel 87 and a corresponding feedback request signal 88 fed back to the finger print stream control processor 77.

Perceptibility Weighting Combiner

Co-pending UK patent application 0424225.1 discloses a technique for weighting coefficients of a water mark or digital finger print code word in accordance with a relative ability of a corresponding part or pixel of an image frame to which the code word is being added, to carry that coefficient without introducing a viewer perceivable effect on the image. A perceptual weighting factor generator for generating the weighting factors for weighting the 8-bit values from the encrypted data streams is not shown in the Figures. An example of such a perceptual weighting generator is provided in the above-mentioned UK patent application 0424225.1.

Figure 8:
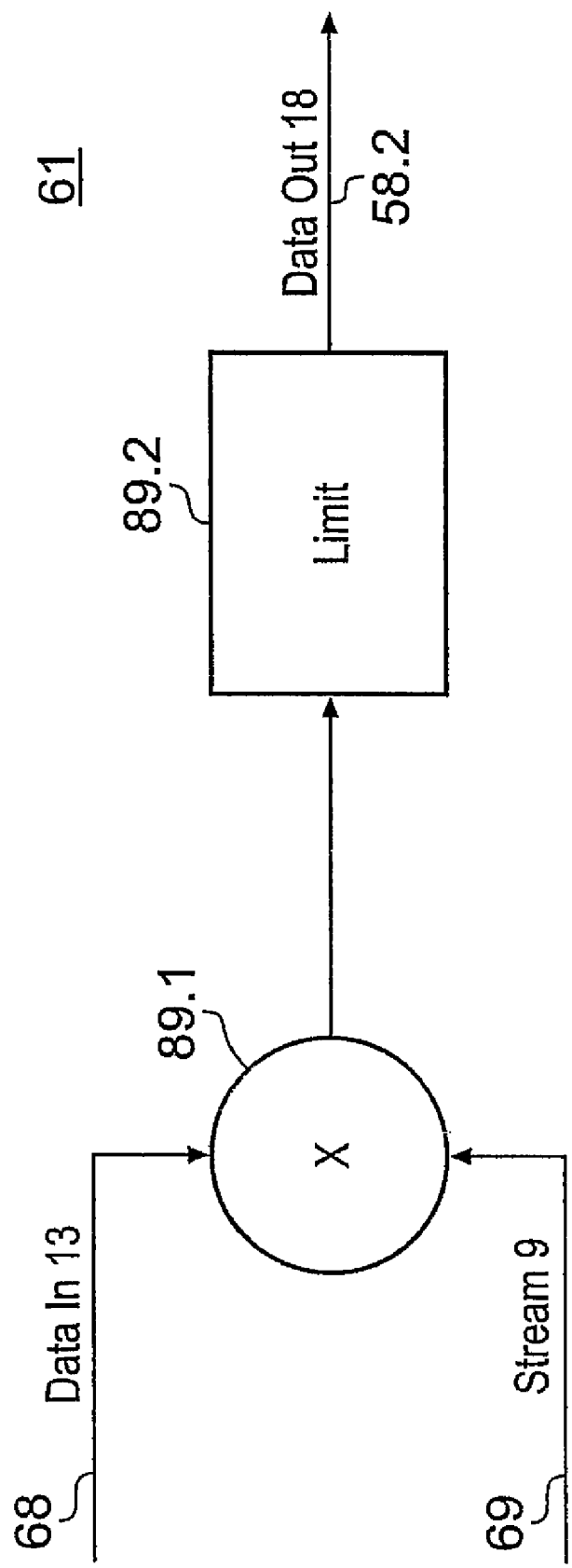
FIG. 8 is a schematic block diagram of a combining processor which forms part of the encoding data processing apparatus of FIG. 5.

An example of the finger print output generator 61, shown in FIG. 5, is provided in FIG. 8. In FIG. 8, the perceptual weighting factors, which have been derived for the video image frame are fed via the input channel 68 to a multiplier 89.1 for multiplication with a corresponding one of the 512 8-bit coefficients of a value of the encrypted data stream, before being limited by a hard limiter 89.2 to form at the output 58.2 water marked coefficients for combining with the samples of the video signal. The output coefficients from the channel 58.2 are combined with the samples of the video signal by addition, which is not shown for this example, but would otherwise be formed by the combiner 22.1 shown in FIG. 4 or the combiner 22 shown in FIG. 1.

The term "samples" is used to refer to discrete samples from which an image is comprised. The samples may be luminance samples of the image, which are otherwise produced from the image pixels. Therefore, where appropriate the term samples and pixels are inter-changeable.

Detecting Processor

Figure 9:
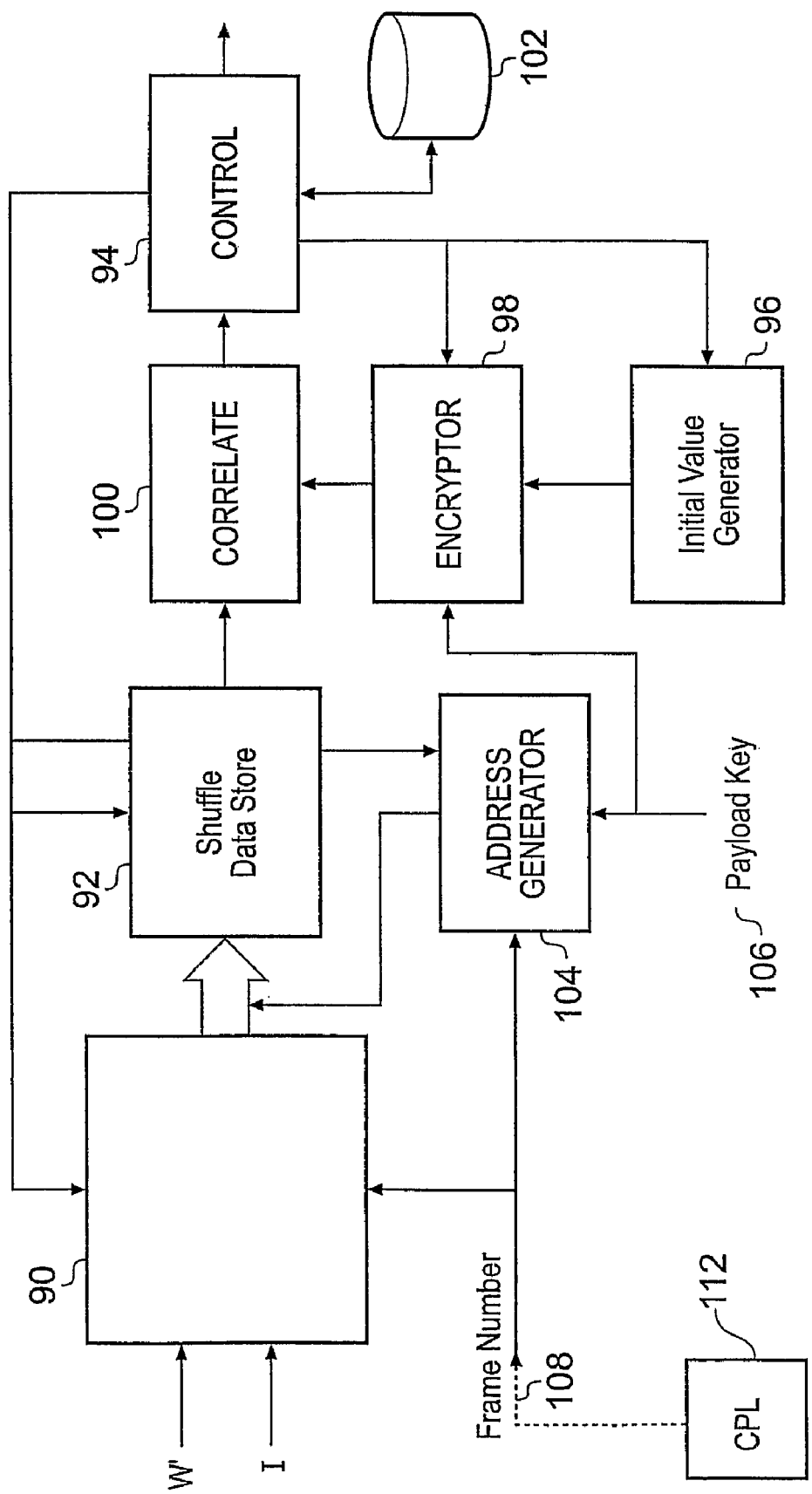
FIG. 9 is a schematic block diagram of a detecting data processing apparatus for detecting a payload data word embedded into video images.

A detecting data processing apparatus, which is arranged to detect code words, which have been embedded in video material items by the encoding data processing apparatus of FIG. 1 to 8 and to recover the payload data word if present in the video material item is shown in FIG. 9. In FIG. 9 an offending version of the watermarked image W' and a copy of the original image I are received in a recovery processor 90. The recovery processor 90 is arranged to process the marked image W' and the original image I and to form an estimate of a code word which may have been embedded in the marked image. For the example, after registering the water marked image W' with the copy of the original image I, the original image I is subtracted from the watermarked image W' to form an estimate of the parts of the code word, which are parts of the encrypted data streams, which have been recovered from the frames of the water marked video image W'. The recovered data streams are then read into a shuffle date store 92.

The detecting data processing apparatus shown in FIG. 9 includes an address generator 104, which is operable in combination with the shuffle data store to re-assemble the water mark code word, by reading the respective parts of each of the encrypted data streams from which the code word is comprised into the data store in a corresponding way to which the shuffle processor 19, 18.1, 24.1, 67 read data out of the shuffle data store in the encoding data processing apparatus. To this end, the address generator uses the payload encryption key 106 and the frame number of the water marked video image 108 to generate, pseudo randomly, at least one address within an address space of a shuffle 92 data store for each of the video frames. The address generator 104 then reads the data representing the estimate of the part or parts of the water mark code word provided from the recovery processor 90 into the shuffle data 92 at locations identified by the pseudo randomly generated address. The address generator is thereby arranged to generate the same address for each frame as those generated by the encoding data processing apparatus, so as to effectively reverse the shuffling performed by the shuffle processor 19, 67.

In accordance with the example encoding data processing apparatus described above with reference to FIGS. 1 and 4, the frame number could be regenerated by the decoder, if the encoder was arranged to use a predetermined number (such as for the FIG. 1 encoder) or the frame number may be provided with the original version of the images (such as for the FIG. 4 encoder). For the example of a digital cinema content data file, in one example a content play list (CPL) 112 of a digital cinema file DCP, which was used to reproduce the original material may be provided to the address generator 104. By providing the CPL 112 to the address generator 104, there is a reduced requirement to search the original content material with respect to the offending material in order to align the frames of the original material to the offending material. By aligning the frames of the material, a greater likelihood is provided that a finger print code word can be recovered from the offending material and the finger print payload detected. Furthermore, by providing the frame number with the original material a time for detecting the finger print code word can be reduced.

As mentioned above, in order to recover the payload data word, the detector shown in FIG. 9 is arranged to re-generate the encrypted data streams and to correlate the encrypted data streams with the recovered data streams read out from the data store 92. To this end, a controller 94 is arranged to regenerate all possible values of each byte of the payload which is being detected using an initial value regenerator 96. The initial value regenerator 96 produces for each of the possible values of the bytes concerned, an initial value in a form corresponding to that shown in FIG. 2 or FIG. 3 as appropriate. The initial values for each byte being detected are then encrypted by an encryption processor 98, which operates to form corresponding encrypted data streams using an encryption algorithm and the payload encryption key, corresponding to that used in the encryption processor 14, 14.1, 14.2. The encrypted data streams are then fed to a correlator 100, which correlates each of the encrypted data streams with the recovered data streams. If a result of any of the correlations exceeds a pre-determined threshold, then the value of the byte or any other parts of the payload, which were used to form the corresponding initial value is determined to be present in the payload data word which has been embedded into the video material. The value of this byte may then be stored in a detected payload data store 102.

The presence of zeros or indeed any other default value which is used by the encoder and known to the decoder for parts of the initial values which do not contain parts of the payload data word can have an effect of improving the orthogonality of the encrypted data streams with respect to one another.

As indicated above, the detection of one part of the payload data word can be used to detect other parts of the payload data word. For example, starting with the first initial value identified by the index field having a value of 1, the first byte 1 can be detected using $2^8$ re-generated encrypted data streams and corresponding correlations. The detection of byte 1 can be used to detect byte 2, because all possible values of byte 2 can be combined with the value from byte 1 read out from the recovered payload data store 102. As a result, a number of correlations which is required to detect the payload data word can be substantially reduced with respect to what would be required if a correlation was being made for all possible values of the payload alone. This is because each byte of the payload is recovered starting with the first and successively increasing the parts of the payload recovered by increasing the initial value number which is searched from 1 to 16, in order to recover the 14 bytes from the first 16 initial values. Correspondingly the next 14 bytes from the subsequent 16 initial values can be recovered using the same process until the entire payload is recovered.

As mentioned above, in one example, the initial values used by the encoding data processing apparatus to form the encrypted data stream include a field index identifying each of the encryption data streams with respect to the others. For this example, the initial value regenerator is operable to regenerate the initial values for the part of the payload data word being detected using a corresponding field index value in order to produce exactly the encrypted stream for which correlation is being performed. Furthermore, the field index may be used to detect the subsequent part of the payload data word.

As mentioned above, the payload data word includes a digital signature 6. The other parts of the payload data word can be considered to have been successfully recovered with a false positive and false negative detection probability established for the water marking/finger printing technique described above. However, if the recovered digital signature is authenticated then the payload can be considered to have been successfully recovered, because authentication as a digital signature requires a corresponding key from a public key/private key pair. Thus combining the signature with a corresponding key from the pair will authenticate the recovery digital certificate. Furthermore, for the example shown in FIG. 2, the correlator will only need to perform $448 \times 2^8$ correlations to detect a 4096-bit payload data word as opposed to $2^{4096}$ correlations, which could otherwise be prohibitively computationally difficult.

Various further aspects and features of the present invention are defined in the appended claims. Various modifications can be made to the embodiments herein before described without departing from the scope of the present invention.

As mentioned above, embodiments of the present invention find application with embedding data in any kind of information material. For example, although the above embodiments have been described with respect to representing a payload data word as a code word and embedding the code word in the form of encrypted data streams in the frames of the video material, the present technique is also applicable to embedding data in audio material. For the example of audio material, in digital form, audio material typically comprises a plurality of data frames, in which the encrypted data streams will be embedded.

According to an aspect of the invention there is provided a method comprising:

selecting, in accordance with an algorithm for generating pseudo random numbers initiated by a seed value, addresses of a memory store containing data, retrieving data from corresponding selected addresses of the memory store, and embedding the retrieved data in an information material item as a watermark.

According to another aspect of the invention there is provided an apparatus comprising:

means for selecting, in accordance with an algorithm for generating pseudo random numbers initiated by a seed value, addresses of a memory store containing data, means for retrieving data from corresponding selected addresses of the memory store, and means for embedding the retrieved data in an information material item as a watermark.

According to another aspect of the invention there is provided a method comprising:

generating, from an information material item, data representative of an estimate of parts of data, which have been embedded in the information material item by the above mentioned method of embedding the data in the material item, generating addresses of a memory store, in accordance with an algorithm for generating pseudo random numbers initiated by a seed value, the seed value being the same as a seed value which is used to embed the data in the information material, storing the data recovered from the information material at locations in the memory store at the generated addresses, and recovering the data from the memory store.

According to another aspect of the invention there is provided an apparatus comprising:

means for generating, from an information material item, data representative of an estimate of parts of data, which have been embedded in the information material item by the apparatus for embedding the data in the material item, means for generating addresses of a memory store, in accordance with an algorithm for generating pseudo random numbers initiated by a seed value, the seed value being the same as a seed value which is used to embed the data in the information material, means for storing the data recovered from the information material at locations in the memory store at the generated addresses, and means for recovering the data from the memory store.

The invention claimed is:

1. An encoding data processing apparatus for generating a marked copy of a material item by embedding data representative of a payload data word into the material item, the material item including a plurality of data frames, the encoding data processing apparatus comprising:
    a code word generator configured to generate a water mark code word from the payload data word and to read data representing the water mark code word into a shuffle data store, the code word generator generating the water mark code word from a plurality of encrypted data streams,
    a shuffle processor configured to generate pseudo randomly at least one address within an address space of the shuffle data store for each of the data frames and to read data representing part or parts of the water mark code word out from the data store at locations identified by the randomly generated address, and
    a data embedding processor configured to receive the material item and to embed the data representing the part or parts of the water mark code word read out from the shuffle data store for each frame into a corresponding frame of the material item.

2. An encoding data processing apparatus as claimed in claim 1, wherein the code word generator comprises:
    a preprocessor configured to receive the payload data word for embedding in the material item and to form a plurality of initial values from the payload data word, and
    an encryption circuit configured to receive the plurality of initial values and a payload key, to encrypt the plurality of initial values to form the plurality of encrypted data streams using the payload key, the encrypted data streams forming the water mark code word, the encrypted data streams being read into the shuffle data store for reading out by the shuffling processor.

3. An encoding data processing apparatus as claimed in claim 2, wherein the pre-processor is configured to divide the payload data word into a plurality of parts,
    to form the plurality of initial values from the plurality of parts, each of the initial values being formed by adding parts of the payload data word to each initial value successively starting with the first part added to the first initial value, and adding the first and second to the second initial value so that each subsequent initial value includes all the parts of the payload data word of those of the previous initial values in addition to a new part of the payload data word.

4. An encoding data processing apparatus as claimed in claim 1, wherein the shuffle processor includes an address generator, the address generator being configured to generate pseudo randomly the at least one address within the address space of the shuffle data store in accordance with an encryption algorithm using an encryption key.

5. An encoding data processing apparatus as claimed in claim 4, wherein the address generator is configured to generate the address using a number associated with each frame in combination with the encryption key.

6. An encoding data processing apparatus as claimed in claim 5, wherein the number associated with each frame is unique and is used by the encryption algorithm in a combination with the encryption key to generated the pseudo-random addresses.

7. An encoding data processing apparatus as claimed in claim 5, wherein the number associated with each frame is derived from a Universal Unique Identifier of a portion of the content material and a frame number within that portion.

8. An encoding data processing apparatus as claimed in claim 1, wherein the at least one address generated by the address generator is arranged to read out from the data store a fraction of the plurality of encrypted data streams forming the water mark code words from the data store for embedding in each frame of the material item.

9. An encoding data processing apparatus as claimed in claim 1, wherein the encryption algorithm in accordance with which the address generator generates the at least one address of the data store is the Rijndael algorithm.

10. A non-transitory computer readable medium bearing data representing a marked copy video material item in which a code word representing a payload data word has been embedded by the encoding data processing apparatus according to claim 1.

11. A media terminal operable to form a marked copy of an item of material for reproduction by introducing a payload data word into a copy of the material, the media terminal comprising:
    a reproducing apparatus for reproducing the material item, and
    an encoding data processing apparatus as claimed in claim 1.

12. A detecting data processing apparatus configured to detect a payload data word embedded within a marked copy of a material item by the encoding data processing apparatus according to claim 1, the detecting data processing apparatus comprising:
    a recovery processor configured to generate, for each frame of the material item data representative of an estimate of part or parts of a water mark code word embedded by the encoding data processing apparatus into each frame of the image, the water mark code word having been generated from a plurality of encrypted data streams,
    an address generator configured to generate pseudo randomly at least one address within an address space of a shuffle data store for each of the frames and to read the data representing the estimate of the part or parts of the water mark code word into the shuffle data store stored at locations identified by the pseudo randomly generated address, the address generator being arranged to generate the same address for each frame as those generated by the encoding data processing apparatus, a code word generator configured under control of a control processor to regenerate each of a plurality of possible code words which may have been embedded within the material item, and a correlator configured under control of the control processor to detect the code word corresponding to the code word which has been embedded to form the market version of the material item, by correlating the re-generated code word with the estimate of the code word read out from the shuffle data store, the control processor being configured to recover the payload data word for the code word detected as a result of the correlation and to recover the data from the plurality of encrypted data streams used to generate the code word.

13. A method of generating a marked copy of a material item by embedding data representative of a payload data word into the material item, the material item including a plurality of frames, the method comprising:

generating a water mark code word from the payload data word, the water mark code word being generated from a plurality of encrypted data streams, reading data representing the water mark code word into a shuffle data store, generating pseudo randomly at least one address within an address space of the shuffle data store for each of the frames, reading data representing part or parts of the water mark code word out from the data store at locations identified by the randomly generated address, and receiving the material item, and embedding the data representing the part or parts of the water mark code word read out from the shuffle data store for each frame into a corresponding frame of the material item.

14. A non-transitory computer readable data bearing medium bearing computer program code, which when loaded onto a data processor performs the method according to claim 13.

15. A method of detecting a payload data word embedded within a marked copy of a material item according to the method of claim 13, the method of detecting comprising:

recovering, for each frame of the material item data representative of an estimate of part or parts of a water mark code word embedded by the encoding data processing apparatus into each frame of the image, generating pseudo randomly at least one address within an address space of a shuffle data store for each of the frames, reading the data representing the estimate of the part or parts of the water mark code word into the shuffle data store at locations identified by the pseudo randomly generated address, the address generator being arranged to generate the same address for each frame as those generated by the encoding data processing apparatus, regenerating each of a plurality of possible code words which may have been embedded within the material item, detecting the code word corresponding to the code word which has been embedded to form the marked version of the material item, by correlating the re-generated code word with the estimate of the code word read out from the shuffle data store, and recovering the payload data word for the code word detected as a result of the correlation.

16. An apparatus for generating a marked copy of a material item by embedding data representative of a payload data word into the material item, the material item including a plurality of frames, the apparatus comprising:

means for generating a water mark code word from the payload data word, the means for generating generating the water mark code word from a plurality of encrypted data streams, means for reading data representing the water mark code word into a shuffle data store, means for generating pseudo randomly at least one address within an address space of the shuffle data store for each of the frames, means for reading data representing part or parts of the water mark code word out from the data store at locations identified by the randomly generated address, and means for receiving the material item, and means for embedding the data representing the part or parts of the water mark code word read out from the shuffle data store for each frame into a corresponding frame of the material item.

17. An apparatus for detecting a payload data word embedded within a marked copy of a material item according to the method of claim 13, the apparatus comprising means for recovering, for each frame of the material item data representative of an estimate of part or parts of a water mark code word embedded by the encoding data processing apparatus into each frame of the image, the water mark code word being generated from a plurality of encrypted data streams, means for generating pseudo randomly at least one address within an address space of a shuffle data store for each of the frames, means for reading the data representing the estimate of the part or parts of the water mark code word into the shuffle data store at locations identified by the pseudo randomly generated address, the address generator being arranged to generate the same address for each frame as those generated by the encoding data processing apparatus, means for regenerating each of a plurality of possible code words which may have been embedded within the material item, means for detecting the code word corresponding to the code word which has been embedded to form the marked version of the material item, by correlating the re-generated code word with the estimate of the code word read out from the shuffle data store, and means for recovering the payload data word for the code word detected as a result of the correlation and for recovering the data from the plurality of encrypted data streams used to generate the code word.

* * * * *